(12) United States Patent
Oppenheimer

(10) Patent No.: US 7,852,555 B2
(45) Date of Patent: Dec. 14, 2010

(54) SPECTROSCOPY OF EXOPLANETS FROM A GROUND-BASED TELESCOPE

(75) Inventor: Ben R. Oppenheimer, New York, NY (US)

(73) Assignee: American Museum of Natural History, New York, NY (US)

( * ) Notice: Subject to any disclaimer, the term of this patent is extended or adjusted under 35 U.S.C. 154(b) by 799 days.

(21) Appl. No.: 11/788,565

(22) Filed: Apr. 20, 2007

(65) Prior Publication Data

US 2008/0259447 A1    Oct. 23, 2008

(51) Int. Cl.
  *G01J 3/00* (2006.01)
  *G02B 27/58* (2006.01)
  *G02B 23/00* (2006.01)

(52) U.S. Cl. ..................................... 359/399

(58) Field of Classification Search .............. 359/399, 359/403, 419
See application file for complete search history.

(56) References Cited

U.S. PATENT DOCUMENTS

| | | | |
|---|---|---|---|
| 4,217,026 A * | 8/1980 | Radovich | 359/611 |
| 4,377,238 A | 3/1983 | Wilks et al. | |
| 4,765,718 A | 8/1988 | Henkes | |
| 4,790,641 A * | 12/1988 | Halldorsson | 359/399 |
| 5,108,168 A * | 4/1992 | Norbert et al. | 359/419 |
| 5,142,400 A * | 8/1992 | Solinsky | 398/129 |
| 5,371,369 A * | 12/1994 | Kent | 250/352 |
| 6,901,220 B1 * | 5/2005 | Carlson et al. | 398/118 |
| 2006/0171022 A1 * | 8/2006 | Lundgren | 359/366 |
| 2006/0182387 A1 | 8/2006 | McGuire, Jr. | |

FOREIGN PATENT DOCUMENTS

| GB | 1 216 075 | 12/1970 |
|---|---|---|
| WO | 83/02667 | 8/1983 |
| WO | 92/06361 | 4/1992 |

OTHER PUBLICATIONS

International Search Report, Written Opinion and Preliminary Report on Patentability issued in connection with corresponding International Application No. PCT/US2008/004928.

* cited by examiner

*Primary Examiner*—Mark Consilvio
(74) *Attorney, Agent, or Firm*—Davidson, Davidson & Kappel, LLC

(57) ABSTRACT

In a first exemplary embodiment of the present invention, an optical device comprises a telescope and a pipescope arranged as a spatial filter to light propagated through the telescope, to confine a field of view to $\theta_{DL}$.

19 Claims, 4 Drawing Sheets

SPECTROSCOPY OF EXOPLANETS FROM A GROUND-BASED TELESCOPE

BACKGROUND OF THE INVENTION

In modern astronomy, an important activity is the search for exoplanets. An exoplanet is a planet in orbit around a star other than the sun. A difficulty encountered in the exoplanet discovery effort is the fact that the star is significantly brighter and larger in size than any exoplanet in orbit around the star. Indirect methods have been utilized to find exoplanets, such as efforts to detect a gravitational effect of the exoplanet on the host star, and changes in luminosity of the host star as a result of the passing of the exoplanet in front of the star.

Once an exoplanet is discovered, it would be advantageous to study the composition of the exoplanet. Spectroscopy is a known scientific tool used for the study of the composition of celestial objects. Spectroscopy analyzes the spectrum of light received from a celestial object to identify the composition. However, an artifact of imaging devices is a broad blurry smudge or "halo" effect around a bright object, such as a star. The halo obscures extremely faint objects next to the star, such as exoplanets, preventing spectral analysis of light from the exoplanet.

A halo effect is symptomatic of astrophysical studies, which rely upon precision measurements of the distribution of light from celestial objects that are typically hampered by strong disturbances to the received light due to the turbulent atmosphere of the earth, as well as by imperfections in the optics of the telescope. A diffraction-limited image refers to a best form of image obtainable using a particular telescope, at a specific location.

A perfect diffraction-limited image is one that is immune to the effects of the atmosphere, optical manufacturing errors or any other source of imaging errors. For years, adaptive optics and space-borne telescopes have achieved diffraction-limited images of varying levels of perfection. The enormous power of diffraction-limited imaging is clear when reference is made to the profound impact that the Hubble Space Telescope, situated above Earth's atmosphere, has had on nearly every field of astronomy. Ground-based adaptive optical systems that form diffraction-limited images, by correcting the deleterious effects of the atmosphere, have facilitated discovery of many types of phenomena as well, including, for example, brown dwarfs, objects intermediate in mass between planets and stars.

A widely used metric for quantifying the level of perfection of an image is the Strehl ratio, S, which is the peak intensity of the observed image of an unresolved or point source divided by the theoretically perfect peak intensity, in which no errors in the wave front are present. When the wave front errors are small, $S=e^{-\sigma^2}$, where $\sigma$ is the standard deviation of the wave front error (the Marechal approximation) and "$\sigma$ sup 2" is $\sigma^2$ ($\sigma$squared). A value of 1.00 or 100% indicates a perfect diffraction-limited image. Images without adaptive optics typically have S~0.5% on telescopes larger than about 1 m. The best ground and space-based images achieve S~80 to 90% in the optical and near infrared wavelengths (0.5 to 3 µm).

As a consequence of the finite size of a telescope, there is diffraction that spreads the light into an Airy-pattern distribution at the image plane formed by the telescope, if it has an un-obscured, circular entrance pupil. 84% of the energy from each point source in such diffraction-limited images is constrained to a tiny spot of diameter $2.44\theta_{DL}$, where $\theta_{DL}=\lambda/D$, $\theta_{DL}$ is the diffraction-limited image resolution, $\lambda$ is the wavelength of light used in the observation and D is the telescope diameter. For reference, $\theta_{DL}$ is 125 nanoradians or 25.8 milliarcseconds (mas) for an 8-m telescope used at a wavelength of 1.0 µm.

In diffraction-limited images, light that is not constrained to the perfect optical diffraction pattern, 1–S, is scattered into a broad blurry smudge that forms the halo effect around each point source of light in the image. As noted, the halo drowns out faint objects that may be next to bright ones. Removing this obscuring halo of light, which is only an artifact of the imaging device and medium through which the light traveled, and not astrophysical in nature, would permit the study of extremely faint objects next to bright stars, such as exoplanets. Indeed, as an example, if the solar system were observed from the vantage of 30 light years distant, Earth would be only 100 mas ($4\theta_{DL}$ for the 8-m telescope) from the Sun and about $10^{10}$ times fainter, thus, completely obscured by the halo of light from the Sun's image in a current telescope. The full width of this halo measured at half the maximum value can be larger than 1 arcsecond, in the case of poorly corrected images made at wavelengths of around 1 µm.

SUMMARY OF THE INVENTION

The present invention provides a method and device for correcting imaging device artifacts to remove a halo effect from images of relatively bright celestial objects.

In a first exemplary embodiment of the present invention, an optical device comprises a telescope and a pipescope arranged as a spatial filter to light propagated through the telescope, to confine a field of view to $\theta_{DL}$.

In a second exemplary embodiment of the present invention, an optical device comprises a mechanism for propagating a beam of light and a pipescope arranged as a spatial filter to the beam of light propagated through the mechanism, to confine a field of view to $\theta_{DL}$.

In a third exemplary embodiment of the present invention, a method for controlling a beam of light comprises the steps of propagating the beam of light through an optical device and utilizing a pipescope to spatially filter the beam of light propagated through the optical device, to confine a field of view to $\theta_{DL}$.

DETAILED DESCRIPTION OF THE PREFERRED EMBODIMENTS

Figure 1:
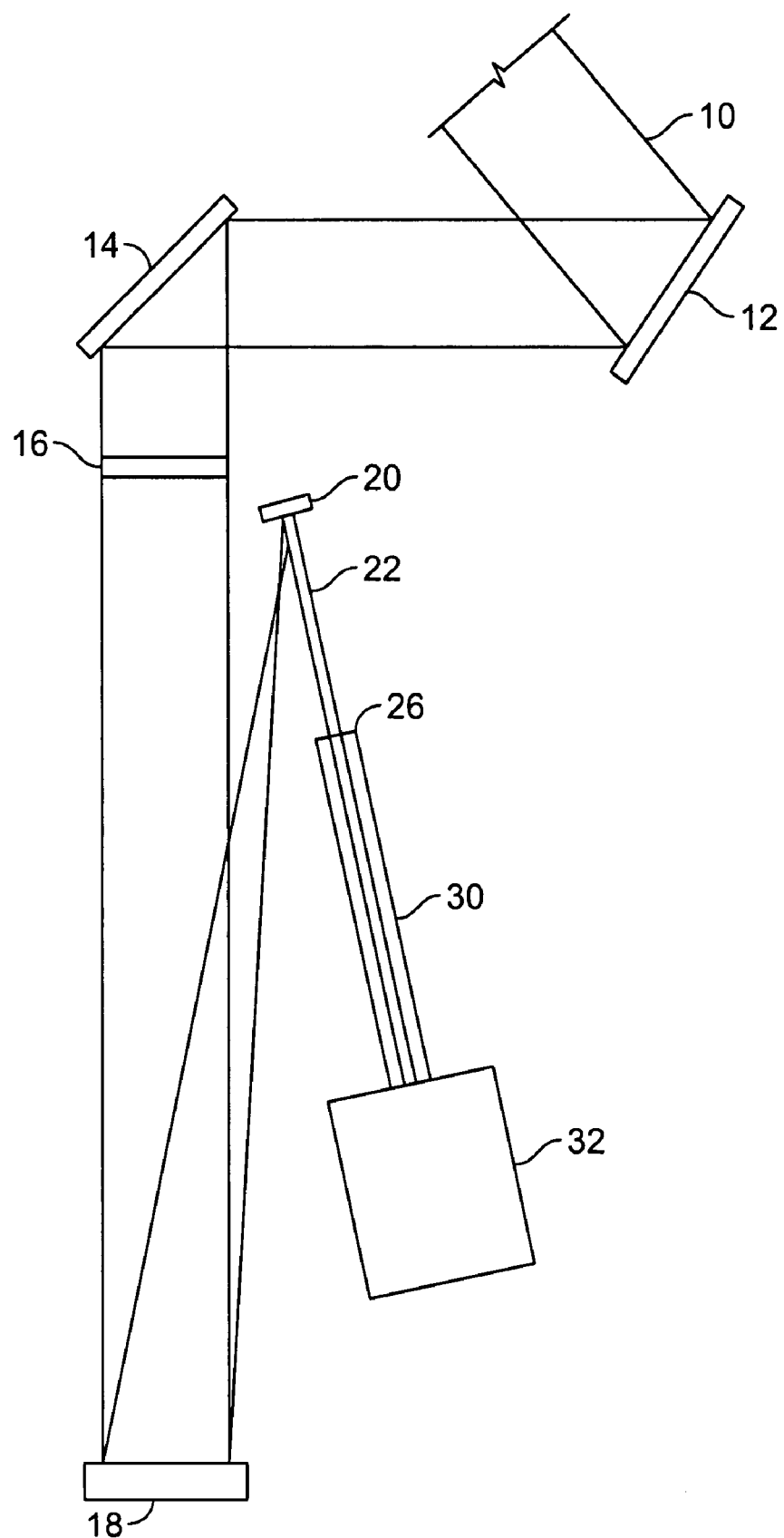
FIG. 1 is a schematic diagram of a telescopic imaging device including a spectrograph and a pipescope according to a feature of the present invention.

Referring now to the drawings, and initially to FIG. 1, there is shown a schematic diagram of a telescopic imaging device including a spectrograph and a pipescope to illustrate an exemplary application of a feature of the present invention. As shown in FIG. 1, the telescope imaging device is configured as a shaped pupil coronagraph coupled to a pipescope according to a feature of the present invention. A beam of light 10 impinges upon a siderostat mirror 12. A siderostat mirror is a flat, first surface mirror movable to selectively capture light from different areas of the night sky. The light beam 10 is reflected by the siderostat mirror 12 to a beam steerer 14, that deflects the light beam 10 to a shaped pupil 16. A shaped pupil 16 provides an entrance aperture for a telescope that is formed to a complex shape arranged and configured to induce an image of a star that has extremely dark regions in close proximity to the star. The image provided by a shaped pupil can be used as a coronagraph. The extremely dark regions permit detection of very faint objects in orbit around the star, for example, exoplanets. (See "Extrasolar Planet Finding via Optimal Apodized and Shaped Pupil Coronographs" by N. Jeremy Kasdin, Robert Vanderbei, David Spergel, and Michael Littman, The Astrophysical Journal, Volume 582, Issue 2 pp. 1147-1161, January 2003.)

From the off-axis primary mirror 18, the light beam 10 converges on a collimating secondary 20, to provide a compressed beam 22. The compressed beam 22 passes from the collimating secondary 20 to an input end of a pipescope 30. According to a feature of the present invention, the input of the pipescope 30 is arranged at a reimaged pupil 26. The reimaged pupil 26 is a location in the beam of light 10 (in the compressed beam 22) that is optically conjugate to the image at the shaped pupil 16. Moreover, the pipescope 30 forms a pipe section having an output end adjacent an input of a spectrograph 32. The pipescope output image that is input to the spectrograph 32 is suitable for spectral analysis of an exoplanet.

Pursuant to the present invention, the pipescope 30 is dimensioned to form a spatial filter of celestial light matched to the diffraction limit of the telescope such that only light from a region of the sky of size $\theta_{DL}$, the diffraction-limited image resolution, is detected. The pipescope 30 comprises a filtering mechanism for control of wave-front errors in a propagated beam of light in an optical system.

A star can be treated as a point source so distant from the telescope that a fully resolved image subtends at most $\theta_{DL}/10$. The pipescope 30 provides an inexpensive and efficient mechanism for correcting wave-front errors that permits a significant simplification of adaptive optical systems. A telescope can be forced to have a field of view equal to $\theta_{DL}$ if the light is propagated along a long tunnel or pipe with a length equal to the Fresnel length, $D^2/\lambda$. In this case, the angle between opposing edges of the pipe ends is $\theta_{DL}$. Conceptually any light that enters the pipescope 30 at an angle larger than $\theta_{DL}$ should not make it to the exit aperture of the pipe and will be absorbed by the pipe. In reality, the pipe will not reject all light from regions of the sky outside of $\theta_{DL}$, because parts of the wave front, especially deviations from the perfectly flat wave front, will spread out as the light propagates through the pipe.

For a qualitative understanding of the action of the pipescope 30, reference is made to Huygen's principle. Any small bump on a wave front will propagate outward in a spherical pattern due to the diffraction by the entrance pupil of the telescope, making the bump smoother and larger. Over the Fresnel length, all but the largest-scale wave front aberrations are removed and the output pupil carries light that has very smooth variations in its complex amplitude field as compared to the entrance wave front. If one considers this from the particular theory of light, photons entering the entrance pupil will only reach the exit pupil if they enter at an angle that is within $\theta_{DL}$ of the telescope pointing on the sky.

For an 8-m telescope operating at $\lambda=1$ μm, the Fresnel length is 64,000 kilometers. Constructing such a pipe, longer than five times the diameter of the Earth, is obviously not practical, but the beam can be compressed. In fact telescopes are essentially beam compressors and the light from a telescope can be recollimated so that a much smaller image of the telescope's pupil can be formed at essentially any chosen value of d=D/M, where M is the magnification at the conjugate pupil image. At that point the Fresnel length is $d^2/\lambda$, or 1 m for d=1 mm and $\lambda=1$ μm.

Because the design of the pipescope is dependent on the wavelength, $\lambda$, of light used, an investigation was conducted on the effect of using a bandpass of light. Most astronomical filters have 20% bandwidths and the pipescope might be operated with even larger bandpasses for scientific reasons. The only effect of using a large bandpass is that the throughput is a function of the wavelength. In the design of the pipescope the length would be set using the smallest wavelength (longest pipescope), meaning that the other wavelengths propagate longer than their corresponding Fresnel lengths. This only requires calibration akin to typical spectroscopic calibrations in standard use in astronomy.

The beam entering the pipescope should be collimated with high precision to realize the full benefits of the free-space propagation. If the collimation is not precise, the beam can be either divergent or convergent. If divergent, energy throughput will be reduced. If the beam is convergent, the goal should be to ensure that the focal length is at least ten times the length of the pipe. The beam f-number would then be 10 d/$\lambda$, typically greater than a few thousand. In the worst case scenario where the focal length is equal to the pipescope length, the propagation benefits are completely removed and an image with a field of view of $\theta_{DL}$ is formed without the rejection effects of the pipescope. Achieving beams with these characteristics is arguably easier than the alignment required for optical interferometers in use today.

Figure 2:
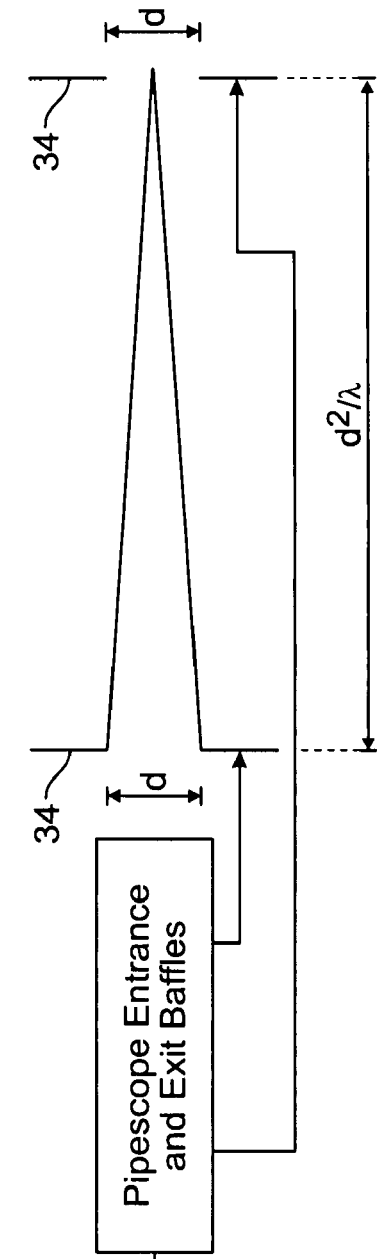
FIG. 2 is a schematic diagram of the pipescope of FIG. 1, according to a feature of the present invention.
Figure 6:
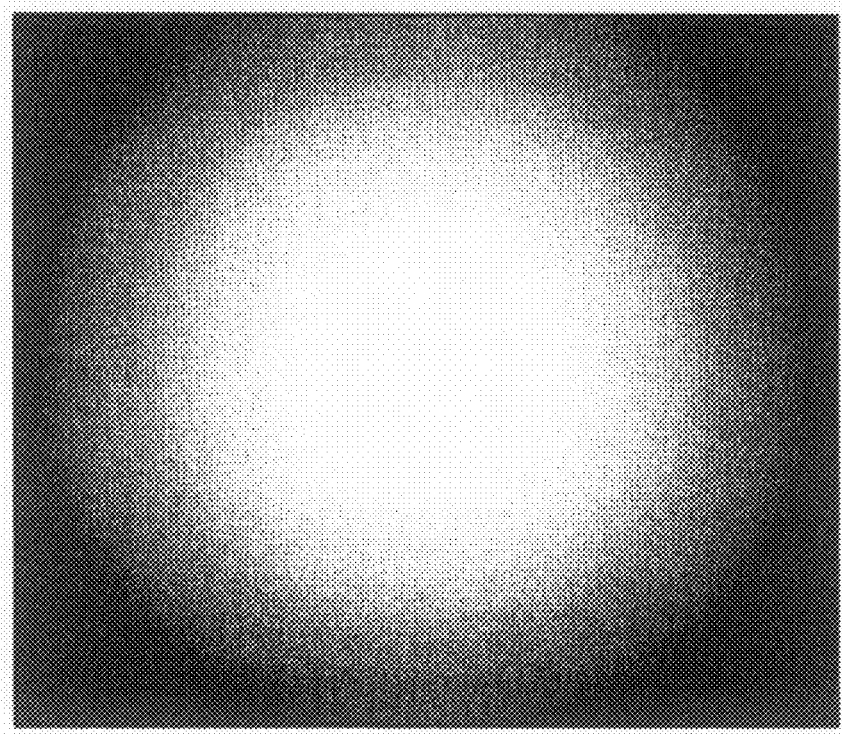
FIG. 6 depicts an intensity apodizer transmission function.

Referring now to FIG. 2, the pipescope 30 comprises two baffles 34, each with a hole of diameter d spaced by the distance n $d^2/\lambda$, where 0.1<n<64. In FIG. 2, n=1. The holes formed in each baffle 34 are shown as circular, but other shapes are possible. The baffles 34 can be encased, for example, in a pipe having a length of n $d^2/\lambda$, and 1 to 10 times d in diameter. In a pipescope 30 having a length of a multiple of n, one or more inner baffles can be arranged between the ends of the pipescope 30, spaced from one another by an amount that is a multiple of n $d^2/\lambda$. The pipescope 30 can be provided with an absorptive inner coating which removes the high spatial frequency variations in the bore sighted wave front and absorbs the light of objects off axis. The angle shown in FIG. 2 is the field of view of the pipescope 30, in the example shown $\lambda$/d. In a case where broadband light is used, over a bandpass of $\lambda_{min}<\lambda<\lambda_{max}$, the length of the pipescope 30 will be n $d_2/\lambda_{min}$. In FIG. 2, the holes formed in the baffles 34 are open holes. In an alternative embodiment of the present invention, a glass element can be inserted into the hole of each baffle 34 as intensity apodization optics, to cause an intensity apodizer transmission function, for example, as depicted in FIG. 6. The transmission function depicted in FIG. 6 or other transmission functions can improve the performance of the pipescope 30.

A simulation of the operation of the pipescope was conducted by generating complex amplitude maps of the electric field at the telescope aperture and then propagating them over a Fresnel length to study the output field. The wave front of light entering the first aperture of the pipe is assumed to have non-uniform intensity due to atmospheric scintillation and a phase function that deviates from that of a perfectly flat wave front due to atmospheric turbulence manifested in small changes in the index of refraction of air. The wave front phase errors are distributed with a Kolmogorov turbulence profile, generally a good model for atmospheric phase disturbances. Atmospheric scintillation effects are simulated using the analytical spatial power spectrum derived from observations. The scintillation affects our results only at the level of one part in one hundred, however.

In the presented simulations, the assumption is that there is no beam compression, but it was established that no change in results occurred for compressed beams down to a value of d=100 μm. If the beam is compressed to the level where d~λ, there may be other optical effects that our simulations do not account for. All simulations are for an unobscured 8-m circular aperture telescope, with an atmospheric model based on a set of turbulent layers following the typical vertical energy distribution for Mauna Kea, Hi. It is assumed that tracking of the object of interest is perfect (no residual tilt errors are present in the telescope), but also investigate the requirement on telescope guiding to make the pipescope work.

Moreover, phase and intensity functions were simulated with 3.4375 cm pixels on a grid that is 2560 pixels across, even though an 8-m pupil would only subtend 232 pixels. These huge arrays for the propagated wave front models permit broad investigation of the electric field complex amplitude as it propagates through the pipe. Input complex amplitude electric fields were constructed for the case of no adaptive optics correction, where S=0.8%, and a series of adaptively corrected wave fronts ranging from S=42% to 95%. No control of intensity variations was assumed in any of the simulations. Wave front correction was simulated using the PAOLA toolbox, based on analytical modeling of the residual phase spatial power spectrum. The adaptive optics system simulated has 44 actuators projected linearly across the 8-m aperture, similar to a planned system for the Gemini Observatory, with integration time and temporal correction lag modeled according to this planned system as well. To investigate the full electric field effects of propagation, a technique was used that is a direct numerical summation of the Fresnel-Kirchoff integral. With the electric field represented as a discrete grid of complex numbers, the integral is computed using fast Fourier transforms.

Figure 3:
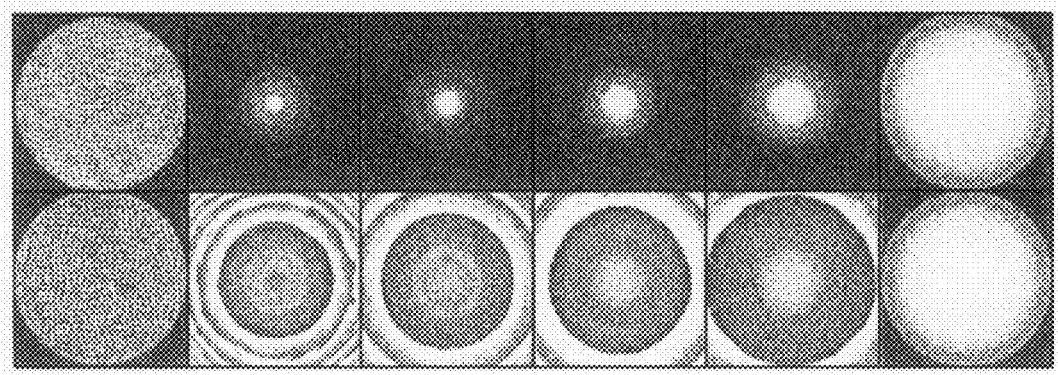
FIG. 3 depicts images showing evolution of intensity and phase of an input electric field through a pipescope, according to a feature of the present invention.

FIG. 3 shows a central region of a set of phase and intensity maps of the light as it propagates through the pipescope. The left panels show the input phase and intensity maps and each subsequent column corresponds to phase and intensity for every $5^{th}$ of a Fresnel length. The final pair of images is baffled with the same size aperture as the input pupil. The field is simulated over an area that is 10 times the size of the input pupil, while the figure only shows the central region for clarity. The example input wave front has S=42%, average performance on many adaptive optical systems. As the field propagates, phase errors turn into intensity variations, and vice versa. This happens on the Talbot length scale, which is dependent on the characteristic spatial frequency of a given phase error, so at any given point in the propagation, some of the input phase errors are manifested as intensity errors.

Table 1 shows the throughput, or percentage of the input intensity that emerges from the exit pupil of the pipescope given perfect bore sighting of the object of interest. The values in the table are an average for 10 different specific realizations for each value of S. The range of values for the set of 10 realizations is shown as well. The throughput is a nearly constant function equal to 0.435, rising slightly as S approaches 100%. The output wave fronts from the pipescope have significant curvature and are dominated by up to tens of waves of focus. If the focus is removed, the output wave front has no measurable errors when S≧42%, though the intensity is reduced by the throughput. For the uncorrected wave fronts (S=0.8%), the wave front errors that propagate to the exit pupil are primarily due to the largest spatial frequency errors in the input wave front, the easiest ones for an adaptive optics system to correct. These largest errors are also the slowest to change due to the atmosphere. The temporal dependence as a function of spatial frequency has been studied elsewhere. It should be noted that the wave front after the pipescope will exhibit significantly slower and far broader phase errors than an adaptive optics system normally controls.

Thus, for a relatively small field of view (λ/D), the pipescope acts as a "natural" wave front correction device. For uncorrected input wave fronts the throughput is comparable to "Lucky Imaging" techniques. For partially corrected wave fronts the throughput is far higher and comparable to existing adaptive optics systems. The pipescope has no moving parts and does not require intensive data reduction or high-speed cameras. To be useful, the pipescope should also reject light from neighboring sources on the sky as close as $\theta_{DL}$.

TABLE 1

Throughput of a pipescope with varying input Strehl ratios, both expressed as percentages.

| | Strehl, S | | | | | | | |
|---|---|---|---|---|---|---|---|---|
| | 0.83 | 42 | 69 | 79 | 88 | 95 | 96 | 98 |
| Throughput Ratio | $0.3_{-0.3}^{+0.5}$ 0.36 | $17.7_{-0.35}^{+0.64}$ 0.42 | $29.8_{-0.30}^{+0.44}$ 0.43 | $34.3_{-0.14}^{+0.19}$ 0.43 | $38.6_{-0.15}^{+0.18}$ 0.43 | $41.4_{-0.10}^{+0.11}$ 0.43 | $41.8_{-0.09}^{+0.07}$ 0.43 | $42.6_{-0.03}^{+0.03}$ 0.43 |

Note:
The error bar notation refers to the range found in a set of ten different simulations for each input Strehl ratio.

A further analysis regards the ability of the pipescope to reject light from outside the field of view. The response of the pipescope to off-axis sources defines the equivalent of the point spread function for this device. Alternatively it can be likened to the beam shape for a radio telescope, indicating the sensitivity as a function of direction in the sky. To evaluate how well the pipescope rejects light from sources other than the one it is pointed at, tilts were added to the input phase screens modeled in the previous section and propagated them through the pipescope. The fraction of electric field energy that emerges from the output pupil of the pipe normalized to the pipe's on-axis throughput was calculated (Table 1). The result of these calculations is shown in part in Table 2 and FIG. 4. The results for all of the values of S are well represented by the three cases presented, with tilts ranging from 1 to 32 $\theta_{DL}$. The last line of Table 2 refers to a perfect (S=100%) Airy function, where there is a list of the fraction of light in a patch that is $\theta_{DL}$ wide and displaced by the off-axis distance (equivalent to the field of view of a pipescope). In the partially corrected cases, the light comparable or superior to the perfect diffraction-limited image with S=100%. In the case of a pipescope without adaptive optics, the performance is superior to a seeing-limited image, although the pipescope has vastly reduced throughput. The pipescope serves as a precision spatial filter.

TABLE 2

Fraction of Light Detected from a Source Off-Axis

| | Off-Axis Distance ($\theta_{DL}$) | | | | | |
|---|---|---|---|---|---|---|
| | 1 | 2 | 4 | 8 | 16 | 32 |
| Fraction for S = 95% | $4.8 \times 10^{-2}$ | $4.8 \times 10^{-3}$ | $4.8 \times 10^{-4}$ | $7.3 \times 10^{-5}$ | $1.7 \times 10^{-5}$ | $4.8 \times 10^{-6}$ |
| Fraction for S = 42% | $1.7 \times 10^{-1}$ | $1.7 \times 10^{-2}$ | $2.3 \times 10^{-3}$ | $2.8 \times 10^{-4}$ | $5.7 \times 10^{-5}$ | $3.4 \times 10^{-5}$ |
| Fraction for S = 0.83% | 0.98 | 0.70 | 0.27 | $3.3 \times 10^{-2}$ | $2.2 \times 10^{-2}$ | $1.7 \times 10^{-3}$ |
| Perfect Image | $3 \times 10^{-2}$ | $4 \times 10^{-3}$ | $2 \times 10^{-3}$ | $3 \times 10^{-4}$ | $3 \times 10^{-5}$ | $1 \times 10^{-5}$ |

To be useful beyond a theoretical idea, the pipescope should be relatively insensitive to telescope pointing and tracking errors. Pointing precision was investigated by examining the throughput as a function of tilt, similar to what was presented in the previous section, but for tilts between 0.05 and $0.9\theta_{DL}$. The results of these calculations are shown in Table 3, where the throughput reduction is defined as a function of misalignment between the pipescope and the actual position of the target of observation in the sky. Throughput reduction is the ratio of the throughput when the object is misaligned to the throughput when it is aligned.

Figure 4:
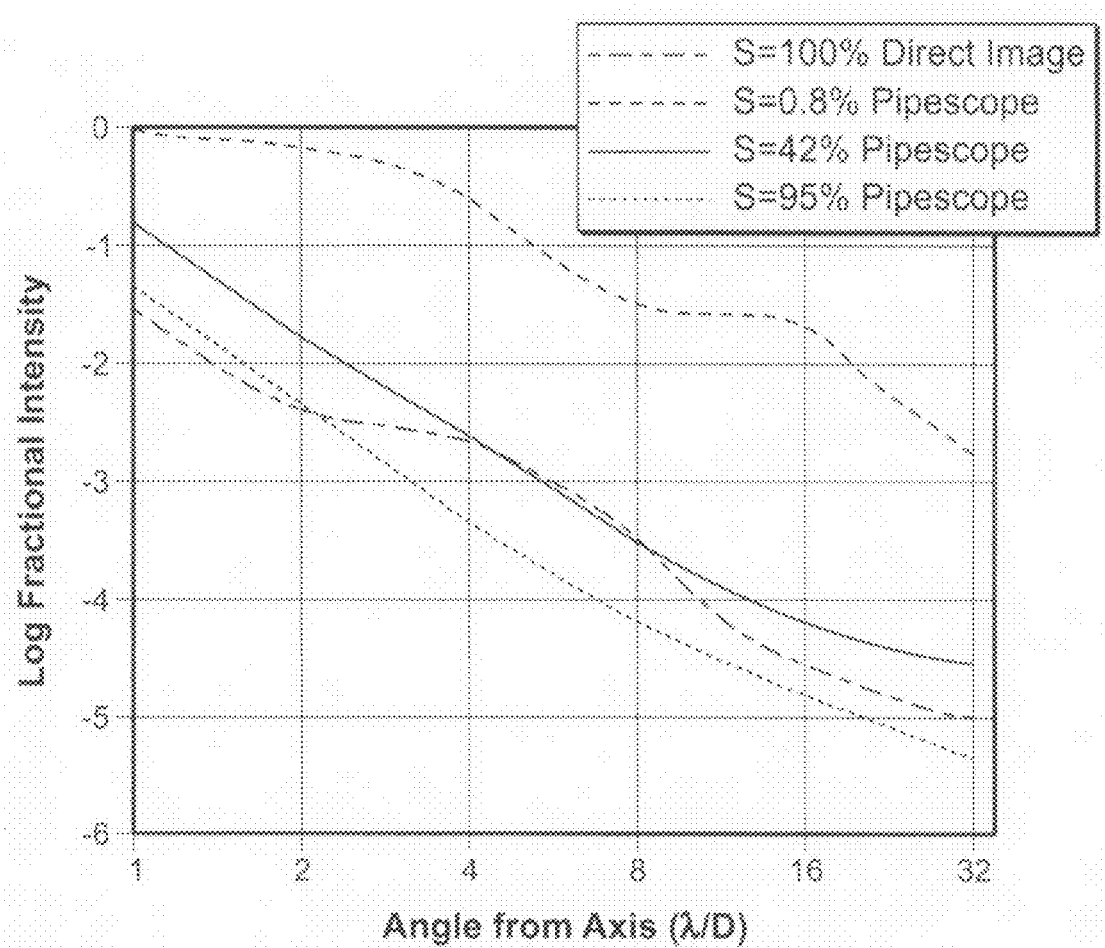
FIG. 4 is a graph of intensity of a star as a function of angular distance from an axis defining the location of the star.

Table 3 reveals several interesting aspects of the pipescope. First, for partially corrected wave fronts, the throughput does not drop by more than 80% for misalignments of less than $0.3\theta_{DL}$. For the 8-m telescope operating at 1 µm, this is equivalent to a residual tilt error of 7.5 mas. Telescopes routinely operate up to 4 times better than this with high-speed image motion compensators. Thus, with proper care, residual tilt is not an issue for the pipescope. Second, in the case of the S=0.8% uncorrected wave front, the throughput fluctuates around the average throughput, sometimes increasing with a misalignment within the range in Table 1. This is due to large phase errors that propagate to the exit pupil of the pipescope. In Table 3, this is indicated by listing the throughput reduction as 1 for all but the last case, although for any given wave front throughput may be improved due to misalignment. On average, though the throughput is a constant function of the misalignment angle. In the graph of FIG. 4, one can see that this is true within $\sim 3\theta_{DL}$. This means that contamination from neighboring sources will be significant and a pipescope without adaptive optics could achieve images of characteristic resolution of about 3 or $4\theta_{DL}$. However, even very modest correction vastly improves the resolution.

If the pipescope is situated behind a high-order adaptive optics system outfitted with a shaped pupil starlight suppression system, as illustrated in FIG. 1, one could detect objects $4 \times 10^{-10}$ times fainter than a star situated only $4\theta_{DL}$ away. Extensive simulation and study of various starlight suppression systems for the Gemini Planet Imager project indicate that shaped pupils are not ideal for ground-based detection and study of exoplanets, but combining their performance on the ground (a relatively constant suppression of $10^{-6}$ from $4\theta_{DL}$ outward along the deepest part of the suppression, assuming an input beam with S=95%), with the additional suppression of a pipescope is a multiplicative effect. The only way to permit the multiplicative starlight suppression is to ensure that the wave front entering the pipescope is of good quality. In the case of classical coronagraphs and their variants, the wavefront after the coronagraph is severely corrupted with amplitude variations converted into phase errors and rms phase errors being up to a wave in magnitude. In fact the wave front is so corrupted that placing a pipescope behind an apodized Lyot coronagraph, for example, results in only a factor of a few improvement in starlight suppression, not factors of $10^4$ to $10^6$. In the case of shaped pupils, several tests have shown laboratory performance where the wave front is controlled after the shaped pupil to very high precision. This ensures the multiplicative behavior, with final suppression numbers given in Table 4.

TABLE 4

Starlight Suppression Pipescope and Shaped Pupil Coronagraphic Technique (SP) as a Function of Angular Separation from the Star

| | Angular Separation ($\theta_{DL}$) | | | |
|---|---|---|---|---|
| | 4 | 8 | 16 | 32 |
| Pipescope | $4.8 \times 10^{-4}$ | $7.3 \times 10^{-5}$ | $1.7 \times 10^{-5}$ | $4.8 \times 10^{-6}$ |
| SP + Pipescope | $4.8 \times 10^{-10}$ | $7.3 \times 10^{-11}$ | $1.7 \times 10^{-11}$ | $4.8 \times 10^{-12}$ |

The faintness of the planets accessible with this technique exceeds the requirement for studying Earth-mass planets several billion years old at separations of $\sim 5\theta_{DL}$ or greater. The

TABLE 3

Throughput reduction of a pipescope due to imprecise alignment of the object of interest

| | Tilt ($\theta_{DL}$) | | | | | | | |
|---|---|---|---|---|---|---|---|---|
| | 0.05 | 0.1 | 0.2 | 0.3 | 0.4 | 0.5 | 0.7 | 0.9 |
| Throughput Reduction for S = 95% | 1.00 | 0.98 | 0.91 | 0.80 | 0.67 | 0.52 | 0.26 | 0.10 |
| Throughput Reduction for S = 42% | 0.97 | 0.95 | 0.88 | 0.79 | 0.69 | 0.55 | 0.35 | 0.18 |
| Throughput Reduction for S = 0.8% | 1 | 1 | 1 | 1 | 1 | 1 | 1 | 0.99 | shaped pupil plus pipescope could form the core of a ground-based observatory to take spectra of planets discovered by imaging surveys. Other coronagraph designs may be usable in this configuration as well. To obtain spectroscopy of extremely faint exoplanets with the pipescope observatory, the location of the planet relative to the star must be known so that the pipescope can be pointed to within $0.3\eta_{DL}$ of the planet. This requires accurate astrometry or accurate ephemerides of the planets one wishes to study as derived through indirect (astrometric and radial velocity) measurements.

Another solution to imaging exoplanets might be to cascade successive coronagraphs in sequence, suppressing starlight in a multiplicative fashion as well. However, a second coronagraph would require the same exquisite nanometer-level wave front control as the first, whereas a pipescope requires no additional complicated moving parts or control systems, nor does it have any optics, only baffles.

While the pipescope permits extremely good rejection of off-axis light and could be used without adaptive optics to map small parts of the sky at the diffraction limit, it only allows for observation of a single "pixel," or diffraction-limited resolution element at a time. To construct an image of even a small portion of the sky would require thousands of pointings and is extremely inefficient. However, a use of an array of pipescopes on a single telescope provides diffraction-limited wide field imaging, with applications across many sub-fields of astronomy.

In order to image the sky, a high quality image of the telescope's pupil must be constructed for each pixel. However, if an image slicer or lenslet array is inserted into a focal plane with $\lambda/D$ sized elements, the pupil plane subsequently reimaged will have a complex amplitude that is convolved with an Airy function with a width the same as the pupil. This convolution destroys the tilt information in the phase of the wave front, meaning that subsequent propagation of this separated light through a pipescope would do nothing to reject light that does not originate from the pixel's corresponding direction in the sky. The simplest solution to this problem is to slice the image into pixels a few times $\lambda/D$ in width, preserving the tilt information and allowing the subsequent pipescope to perform as expected. Each pixel (or lenslet in the focal plane) would require its own pipescope and as such a grid of pipes would be situated at the output of the lenslet array. The lenslet array would probably be a pair of arrays to produce collimated beams with pupil images at the entrance aperture of the pipe grid. Unfortunately, making the lenslets larger in the focal plane means that the instrument sacrifices image resolution and will not achieve the true diffraction-limit, although in principle, such a device could be used on a large telescope for huge gains in image resolution over seeing-limited images, even without adaptive optics (where it was already shown that the pipescope is better suited to a field of view of 3 or $4\theta_{DL}$). Increasing the lenslet width means greater throughput and shorter pipes, since the field of view would only be restricted to whatever image plane sampling is chosen. Indeed, $4\theta_{DL}$ lenslets without adaptive correction of the input wave front, gives 16 times the throughput or about 5.6% compared to $\theta_{DL}$ and the pipes would be $\frac{1}{4}^{th}$ as long. For an 8-m telescope imaging at 1 μm, $4\theta_{DL}$ resolution is a five to ten times improvement over seeing-limited images.

Figure 5:
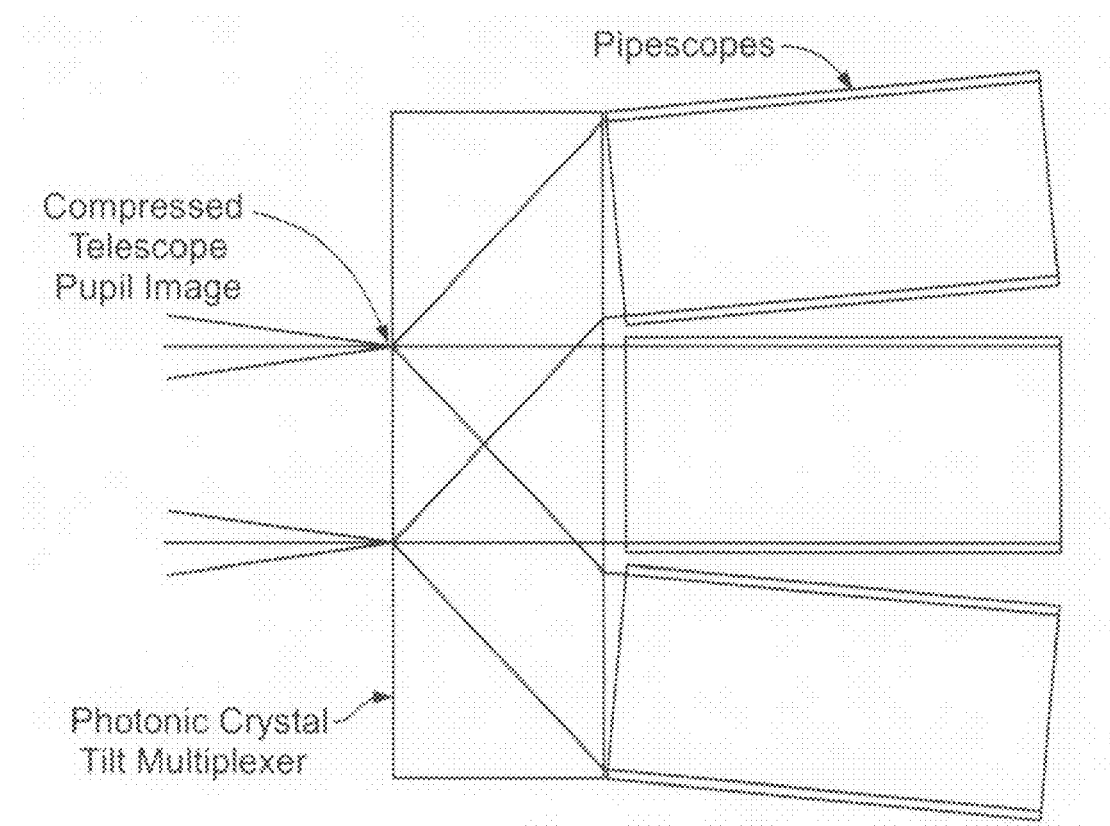
FIG. 5 is a schematic diagram of an imaging pipescope device.

There is another possible solution to using the pipescope to achieve extremely high fidelity images on a large telescope with modest adaptive optical correction. The light entering a telescope pupil is essentially a multiplexed channel consisting of signals from anywhere in the telescope's field of view. If one could "de-multiplex" this pupil (FIG. 5) solely by the tilt angle on each wave front of light incident on the pupil, each signal (corresponding to a different object in the sky) could be sent independently down its own pipescope for rejection of light from other parts of the field of view. In the field of photonics and metamaterials, significant efforts are underway to achieve efficient and compact optical signal multiplexing for many applications, including optical computing. For astronomy, some of these new devices may provide exactly the sort of optical behavior that the imaging pipescope requires. For example, the "superprism effect" and its "ultra-refraction" which has been observed in certain photonic crystals, could be used to achieve this sort of de-multiplexing. On the other hand, the pipescope would become irrelevant if "perfect" imaging without diffraction via large negative index lenses can be proven in the laboratory and made practical for the field. In such a case the very nature of telescopes, indeed all imaging devices, might change.

In the preceding specification, the invention has been described with reference to specific exemplary embodiments and examples thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. An optical device, comprising:
   a telescope having a diameter D, operable at a wavelength $\lambda$; and
   a pipescope arranged as a filter to remove wavefront errors from collimated light received from the telescope and to spatially filter said collimated light to confine a field of view to $\theta_{DL}$, wherein $\theta_{DL}=\lambda/D$, said pipescope having an entrance hole having a diameter d, and having a length equal to $n\, d^2/\lambda$, wherein $d=D/M$, and M is a magnification at a conjugate pupil image of the telescope, and $0.1<n<64$.

2. The optical device of claim 1 wherein the pipescope comprises a pair of baffles mounted in a spaced relation in a pipe section.

3. The optical device of claim 2 wherein the baffles each include a hole of diameter d, the baffles being spaced by a distance $n\, d^2/\lambda$, wherein $d=D/M$, and M is a magnification at a conjugate pupil image of the telescope, and $0.1<n<64$.

4. The optical device of claim 3 wherein the hole of each one of the pair of baffles includes intensity apodization optics.

5. The optical device of claim 3 wherein the pipescope has a diameter within a range of 1-10 times d.

6. The optical device of claim 3 wherein a first of said baffle holes is the entrance hole.

7. The optical device of claim 3 wherein the pair of baffles is arranged such that the pair of baffles provides one baffle at each distal end of the pipe section, and further comprising at least one inner baffle arranged and configured along the length of the pipe section, between the pair of baffles.

8. The optical device of claim 1, further comprising a coronagraph, the light passing through the coronagraph before entering the pipescope.

9. The optical device of claim 8, wherein the coronagraph is a shaped pupil coronagraph.

10. The optical device of claim 9, further comprising
    a collimating mirror for collimating the light from the coronagraph; and
    a reimaged pupil, the reimaged pupil being within the collimated beam from the collimating mirror, the pipescope receiving the collimated light from the reimaged pupil.

11. The optical device of claim 10, wherein the light is celestial light, the telescope is a ground based telescope arranged to receive the celestial light, and the pipescope is arranged as a spatial filter to the celestial light propagated through the ground based telescope, to confine the field of view of the ground based telescope to a region of sky of size $\theta_{DL}$, and to filter wave front errors in the propagated light.

12. The optical device of claim 1, wherein the telescope includes a collimating mirror, the collimating mirror compressing light passing through the telescope to provide said collimated light.

13. The optical device of claim 1 further comprising a shaped pupil arranged upstream from an input of the pipescope.

14. The optical device of claim 1 wherein the pipescope comprises an array of pipescopes, in tilt relationships to one another, each arranged to receive a separate portion of the field of view.

15. The optical device of claim 1 wherein an input end of the pipescope is arranged at a reimaged pupil of the telescope.

16. A method for controlling a beam of light, comprising the steps of:
    operating an optical device at a wavelength $\lambda$, the optical device having a diameter D,
    propagating the beam of light through the optical device to provide a collimated beam of light, and
    propogating the collimated beam of light through a pipescope to remove wavefront errors from collimated light received from the optical device and to spatially filter the collimated beam of light to confine a field of view to $\theta_{DL}$, wherein $\theta_{DL}=\lambda/D$, wherein said pipescope has an entrance hole having a diameter d, and has a length equal to n $d^2/\lambda$, wherein d=D/M, and M is a magnification at a conjugate pupil image of the optical device, and 0.1<n<64.

17. The method of claim 16, wherein the optical device is a telescope.

18. The method of claim 16, wherein the optical device is a ground-based telescope, and wherein:
    the step of propagating the beam of light comprises propagating a beam of celestial light through the ground-based telescope and recollimating the light from the telescope; and
    the step of propagating the collimated light through the a pipescope comprises utilizing the pipescope to spatially filter the beam of celestial light propagated through the ground-based telescope, to confine the field of view of the ground based telescope to a region of sky of size $\theta_{DL}$.

19. The method of claim 18, further comprising the step of performing a spectral analysis of the spatially filtered beam of celestial light with a spectrograph, wherein the spectral analysis is a spectral analysis of an exoplanet in the field of view.

* * * * *